United States Patent Office 3,663,556
Patented May 16, 1972

3,663,556
METHOD FOR PREPARING ALKALI METAL SALTS OF 3-HYDROXY - 2-OXO-1(2H)-PYRIDINE-SULFONIC ACID
John Valdemar Brammer Petersen and Niels Clauson-Kaas, Farum, Denmark, assignors to Geigy Chemical Corporation, Ardsley, N.Y.
No Drawing. Application June 25, 1968, Ser. No. 751,650, now Patent No. 3,553,224, Jan. 5, 1971, which is a division of application Ser. No. 544,685, Apr. 25, 1966, now Patent No. 3,419,570, dated Dec. 31, 1968. Divided and this application Aug. 19, 1970, Ser. No. 65,327
Claims priority, application Switzerland, Apr. 29, 1965, 5,938/65, 5,939/65, 5,940/65
Int. Cl. C07d 34/48
U.S. Cl. 260—294.8 R
4 Claims

ABSTRACT OF THE DISCLOSURE

Alkali metal salts of 3-hydroxy-2-oxo-1(2H)-pyridine-sulfonic acid are prepared from furfural, a chlorinating agent, sulfaminic acid and an alkali metal ion-donating agent.

CROSS REFERENCE

This application is a division of our earlier copending application Ser. No. 751,650, filed June 25, 1968, now U.S. Patent No. 3,553,224 dated Jan. 5, 1971, the latter being a division of our earlier application Ser. No. 544,-685, filed Apr. 25, 1966, now U.S. Patent No. 3,419,570 dated Dec. 31, 1968.

DETAILED DESCRIPTION

This invention relates to a process for the production of salts of 3-hydroxy-2-oxo-1(2H)-pyridine-sulfonic acids which are useful intermediates for the production of 2,3-pyridinediol.

More particularly, such intermediates of the formula

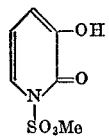

wherein Me is an alkali metal,
are prepared by a process which consists essentially of:
(1) Reacting with each other in an aqueous medium,
(a) furfural,
(b) a chlorinating agent selected from among chlorine and an agent releasing chlorine in aqueous medium, the molar ratio of (a) to (b) ranging from about 1:1 to 2:3, and
(c) sulfaminic acid, and adjusting the pH of the reaction mixture during the reaction with sulfaminic acid to below 0.5,
(2) Adding to the reaction medium an alkali metal ion-donating agent in sufficient amount to precipitate the alkali metal salt of 3-hydroxy-2-oxo-1(2H)-pyridine-sulfonic acid, and
(3) Recovering the latter salt formed from the reaction mixture.

In a preferred embodiment sulfaminic acid is added in an amount of about 0.5 to 1.5 moles per mole of furfural.

In order to ensure precipitation of the alkali metal salt practically free from other byproducts, it is preferable to use in step (1) the pH below 0, and the total volume of the reaction mixture after addition of sulfaminic acid thereto should be less than 10 litres, and preferably only from 1 to 2 litres, calculated on every mole of furfural used as starting material.

The alkali metal 3-hydroxy-2-oxo-1(2H)-pyridine-sulfonate and especially the sodium salt according to the invention are reactive substances which can be used as intermediate products for the production of many other substances. It has also been found that these salts, and especially the sodium salt, can easily be converted into 2,3-pyridinediol by storing them with water at room temperature or heating them with water.

The sodium salt is preferred because it precipitates more readily from the reaction mixture, than, e.g. the potassium salt, the latter being of greater solubility in aqueous media.

Water can serve as reaction medium for the chlorination and reaction with sulfaminic acid; with high concentrations of the reaction components it is recommended to use a mixture of water and a solvent which is miscible therewith or easily soluble therein such as, e.g. methanol, ethanol, propanol, isopropanol, tert.butanol, methoxyethanol, ethoxyethanol, n-butoxyethanol, dimethyl formamide, acetic acid or dioxan.

The chlorine can be introduced into the reaction, for example, in the gaseous state or as sodium hypochlorite. Examples of suitable catalysts for the chlorination are bromides and iodides which are soluble in the reaction medium such as sodium bromide or potassium iodide, or other inorganic compounds such as molybdenum salts which, in this step of the process increase the yields in oxidation with halogen. The chlorination is preferably performed at a pH below 6.

Sulfaminic acid, the amount of which should preferably be 0.5–1.5 mol calculated on the furfural, can be added to the aqueous chlorinated furfural solution either as such, or in the form of one of its salts such as the sodium salt, or the potassium salt. The ensuing reaction should be performed in a strongly acid, e.g. in 1 N to 3 N mineral acid medium, care being taken to ensure that the conversion of all chlorine introduced during the chlorination is practically complete.

Preferably, a mixture (a) of free sulfaminic acid and a strong mineral acid, e.g. concentrated hydrochloric acid, is added to the aqueous chlorinated furfural solution (b) containing sufficient cation-donating agent to precipitate the desired end product, the mixture (a) of sulfaminic acid and mineral acid being of sufficient strength to impart to the resulting reaction mixture of (a) and (b) a pH below 0.5 and preferably below 0.

This practically eliminates the possibility of a reaction between sulfaminic acid and chlorinated furfural at a pH above 0.5 or higher, which reaction would lead to the formation of 3-hydroxy-2-imino-1(2H)-pyridine sulfonic acid as byproduct, which latter acid is difficult to separate from the desired salt of 3-hydroxy-2-oxo-1(2H)-pyridine-sulfonic acid.

The pH desired in any phase of the sequence of reactions according to the invention, can be attained by the addition of compounds having a basic or acid reaction, provided that the pH has not already been suitably adjusted by the reaction components and reaction products. Suitable basic compounds are, e.g. hydroxides, carbonates or acetates of the alkali metals or of ammonium ions. Suitable acid compounds are, e.g. hydrochloric acid, sulfuric acid and acid sulfates as well as organic acids such as, e.g., acetic acid. The reaction with chlorine can be performed either before or after the addition of the sulfaminic acid, but it is preferably performed beforehand. It is performed below 40° and above the solidification temperature of the reaction mixture, preferably, however, between −10° and 10°.

The reaction of sulfaminic acid and the furfural solution, which may be already have been treated with chlorine, is performed within a temperature range which is limited by the crystallization point of the reaction mixture and the boiling point thereof; it is preferably performed, however, between 0° and 20°.

To isolate, e.g., the sodium salt of 3-hydroxy-2-oxo-1(2H)-pyridine sulfonic acid, at least equimolar amounts of sodium ions must be present in the reaction mixture or be added thereto after the reaction. Suitable agents for donating alkali metal ions are sodium acetate, sodium sulfamate, sodium carbonate or sodium hydrogen carbonate, and the correspoding potassium compounds. The precipitated sodium 3-hydroxy-2-oxo-1(2H)-pyridine-sulfonate can be recovered by filtration and washing, e.g., with ethanol, in a pure form.

If it is desired to produce 2,3-pyridinediol, either the isolated alkali metal 3-hydroxy-2-oxo-1(2H)-pyridine sulfonate can be stored with water at room temperature or heated for a short time, whereupon a quantitative yield of 2,3-pyridinediol is formed, or the above reaction mixture, which optionally, but not necessarily, may contain an equimolar amount of alkali metal, e.g. sodium ions, i.e., in which the alkali metal 3-hydroxy-2-oxo-1(2H)-pyridine-sulfonate is present, can be stored at room temperature or boiled for a short time. The 2,3-pyridinediol formed is isolated by filtration or by extraction, e.g. with diethyl ether, from the aqueous reaction mixture. Finally, 2,3-pyridinediol can be obtained from the mother liquor from which the sodium salt has been separated by storing or heating the latter and subsequent extraction as described.

Thanks to the novel process of the present invention, 2,3-pyridinediol, which has hitherto been obtained only with difficulty, has been rendered easily acessible, so that, from an economic point of view also, it is now readily available as starting material for the production of valuable organic compounds. In particular, it can be used as coupling component in the production of novel azo dyes.

The following examples will serve to further typify the nature of the present invention, but they should not be construed as a limitation on the scope thereof.

Example 1

(a) 71.0 g. of chlorine (=42.8 ml. measured at −80°, 1.00 mol) are introduced through a cylindrical sintering glass tube at 0° while stirring well into a suspension of 96.1 g. (1.00 mol) of furfural in 700 ml. of water, the addition being made within 30 minutes. During the reaction, the furfural is dissolved and a slight amount (about 5 g.) of an oily substance separates out simultaneously, which clings to the walls of the reaction vessel. 40% sodium hydroxide solution is then added dropwise while stirring at 0° until the pH is 2 (about 200 g., 2.0 mol). The reaction mixture is decanted from the oily precipitate and diluted with water to 1000 ml. If the pale-yellow solution cannot be further worked-up immediately, it is cooled to about −25° at which temperature it can be stored for about one day without any noticeable alteration.

(b) 30.0 g. (0.31 mol) of pulverized sulfaminic acid, 100 ml. of water and 60 ml. of concentrated hydrochloric acid are mixed in 1 liter flask and the suspension obtained is cooled to −5°. 200 ml. (about 0.20 mol) of a reaction solution according to (a) which has been stored for four weeks at −25°, are added all at once and the mixture is vigorously stirred for 1 hour at 10°. After about 5 minutes the sodium salt of 3-hydroxy-2-oxo-1(2H)-pyridine-sulfonic acid begins to precipitate, and the mixture quickly turns into a thin slurry. 350 ml. of ethanol are added, the suspension is cooled to −10° while stirring and is filtered through a sinter glass filter. The filter residue of white crystals of the sodium salt is washed on the filter (without stirring) with 80 ml. of ethanol and with diethyl ether and then, as a thin layer on paper, it is dried room temperature. The yield of sodium salt is 19.2 g., (43% of the theoretical).

If in (b), instead of the stored reaction solution according to (a), a fresh solution is used, then 16.7 g. of pure sodium salt are obtained (37% of the theoretical).

(c) 15.0 g. (0.067 mol) of the sodium salt obtained according to (b) are suspended in 75 ml. of water, and the suspension is boiled for 15 minutes. After cooling, 2.75 g. (0.067 mol) of 97.5%, solid sodium hydroxide are added, and the suspension of 2,3-pyridinediol obtained is continuously extracted with diethyl ether for about 15 hours. The ethereal suspension is reduced to a volume of about 50 ml. and then filtered, whereupon 7.56 g. of 2,3-pyridinediol are obtained. M.P. 253–254° (in evacuated tube, Hershberg Apparatus, corrected). The yield is 100%, calaculated on the sodium salt of 3-hydroxy-2-oxo-1(2H)-pyridine sulfonic acid, and 43% calculated on the furfural.

(d) Further 2,3-pyridinediol (about 1.75 g., corresponding to 10% of the theoretical) can be obtained from the mother liquor formed according to (b) of the sodium salt of 3-hydroxy-2-oxo-1(2H)-pyridine sulfonic acid by boiling it, cooling and continuously extracting it with diethyl ether analogously to (c).

Similar results are obtained when using in step (a) 40% potassium hydroxide solution. However, the yield of potassium 3-hydroxy-2-oxo-1(2H)-pyridine sulfonic acid obtained at the end of step (b) is somewhat lower due to the greater solubility of the potassium salt in the reaction liquor.

Example 2

19.2 g. (0.20 mol) of furfural and 30.0 g. (0.29 mol) of sulfaminic acid are dissolved at 0° in a mixture of 240 ml. of water and 60 ml. of concentrated hydrochloric acid. 14.2 g. (0.20 mol) of chlorine are added within 30 minutes at 0° while stirring, the acidity of the solution (3 N hydrochloric acid) being kept constant by the addition of 40% sodium hydroxide solution (automatically under electrometric control). The reaction mixture is then stirred for 1 hour at 10°. The precipitated sodium salt of 3-hydroxy-2-oxo-1(2H)-pyridine sulfonic acid is filtered, washed with ethanol and with ether, and dried; yield: 2.80 g. (6.5% of the theoretical). The salt can be converted quantitatively into 2,3-pyridinediol as described in Example 1(c). The mother liquor of the sodium salt is refluxed for 5 minutes, the pH adjusted to 4.5 with 40% sodium hydroxide solution and then continuously extracted with diethyl ether whereupon 2.90 g. (13% of the theoretical) of 2,3-pyridinediol is obtained.

Example 3

15 g. of chlorine (0.21 mol) are introduced within 35 minutes while stirring vigorously at 0° into a solution of 19 g. of furfural (0.20 mol) and 1 g. of sodium bromide in 60 ml. of water and 30 ml. of acetic acid, the pH being kept at 1 by the addition of, in all, 33 g. of sodium acetate (0.40 mol). 200 ml. of water, 60 ml. of concentrated hydrochloric acid and 29 g. of sulfaminic acid (0.3 mol) are added to the reaction mixture at 10°, and the mixture is stirred for 70 minutes at 10°. After cooling to 0° and adding 200 ml. of ethanol, the precipitated sodium salt of 3-hydroxy-2-oxo-1(2H)-pyridine-sulfonic acid is filtered, washed with 80 ml. of ethanol and then with diethyl ether and dried in the air; yield: 15.3 g. (34% of the theoretical).

Example 4

14 g. of chlorine (0.20 mol) are introduced at 0° while stirring vigorously into a suspension of 19 g. of furfural (0.20 mol) in 170 ml. water. After adding 19 g. of sulfamic acid (0.20 mol) the temperature of the reaction mixture is raised to 25° for 3 minutes, whereupon the sulfamic acid dissolves and reacts with the oxidation product. The solution is cooled to 10° for 3 minutes and the sodium salt of the 3-hydroxy-2-oxo-1(2H)-pyridine-sulfonic acid is precipitated by the addition of a solution of 23 g. of sodium chlorine (0.39 mol) in 180 ml. of water. After the addition of 350 ml. of ethanol and cooling to —10°, the sodium salt of 3-hydroxy-2-oxo-1-(2H)-pyridine-sulfonic acid is filtered, washed with 80 ml. of ethanol and then with diethyl ether and dried in the air. The yield is 12.8 g. (29% of the theoretical).

Example 5

63 ml. of sodium hypochlorite solution (containing 11.2 g. of active chlorine per 100 ml.) (0.10 mol) are added dropwise within 15 minutes at 0° while stirring to a solution of 9.6 g. of furfural (0.10 mol) and 0.5 g. of potassium iodide in 150 ml. of 1 N hydrochloric acid. After standing for 10 minutes, about 1.5 g. of sodium thiosulfate are added to decompose traces of active halogen. 25 ml. of concentrated hydrochloric acid, 6 g. of sodium chloride (0.10 mol) and 15 g. of sulfaminic acid (0.15 mol) are added at 10°, and the mixture is stirred for 70 minutes at 10°. After adding 350 ml. of ethanol and cooling to 10°, the sodium salt of 3-hydroxy-2-oxo-1(2H)-pyridine-sulfonic acid formed is filtered, washed with 80 ml. of ethanol and then with diethyl ether, and dried in the air. The yield is 9.6 g. (43% of the theoretical).

What is claimed is:

1. A process for the production of alkali metal salts of 3 - hydroxy-oxo-1(2H)-pyridine-sulfonic acid, which consists essentially of:
   (1) reacting with each other in an aqueous medium
      (a) furfural,
      (b) a chlorinating agent selected from among chlorine and an agent releasing chlorine in aqueous medium, the molar ratio of (a) to (b) ranging from about 1:1 to 2:3, and
      (c) sulfaminic acid,
   and adjusting the pH of the reaction mixture during the reaction with sulfaminic acid to below 0.
   (2) adding to the reaction medium an alkali metal ion-donating agent in sufficient amount to precipitate the alkali metal salt of 3-hydroxy-2-oxo-1(2H)-pyridine-sulfonic acid, and
   (3) recovering the latter salt formed from the reaction mixture.

2. A process as defined in claim 1, wherein sulfaminic acid is added in an amount of about 0.5 to 1.5 moles per mol of furfural.

3. A process as defined in claim 1, wherein the reaction is carried out below 40° and above the solidification temperature of the reaction mixture.

4. A process as defined in claim 1, wherein the reaction is carried out at a temperature of from —10° to +10°.

References Cited

Grammaricakis: Chem. Abstracts, vol. 54, 8810g–8812c, May 10, 1960.

ALAN L. ROTMAN, Primary Examiner

U.S. Cl. X.R.

260—156, 297 R

PO-1050
(5/69)

UNITED STATES PATENT OFFICE
CERTIFICATE OF CORRECTION

Patent No. 3,663,556         Dated May 16, 1972

Inventor(s) JOHN VALDEMAR BRAMMER PETERSEN ET AL

It is certified that error appears in the above-identified patent and that said Letters Patent are hereby corrected as shown below:

Column 1, line 6, after "assignors to" insert -- CIBA- -- and delete "Chemical" after "Geigy";

Column 5, line 27, after "3-hydroxy-" insert -- 2- -- before "oxo-"

Signed and sealed this 2nd day of July 1974.

(SEAL)
Attest:

EDWARD M. FLETCHER, JR.                C. MARSHALL DANN
Attesting Officer                      Commissioner of Patents df